United States Patent [19]

Takahira

[11] Patent Number: 4,930,129
[45] Date of Patent: May 29, 1990

[54] IC CARD HAVING INTERNAL ERROR CHECKING CAPABILITY

[75] Inventor: Kenichi Takahira, Hyogo Prefecture, Japan

[73] Assignee: Mitsubishi Denki Kabushiki Kaisha, Japan

[21] Appl. No.: 166,624

[22] Filed: Mar. 11, 1988

[30] Foreign Application Priority Data

Mar. 13, 1987 [JP]  Japan .................................. 62-59808

[51] Int. Cl.$^5$ .............................................. G06F 11/10
[52] U.S. Cl. .................................... 371/40.4; 371/37.1
[58] Field of Search ........................ 371/38, 39, 37, 40

[56] References Cited

U.S. PATENT DOCUMENTS

| | | | |
|---|---|---|---|
| 4,672,614 | 6/1987 | Yoshida | 371/38 |
| 4,710,934 | 12/1987 | Traynor | 371/38 |
| 4,730,320 | 3/1988 | Hidaka | 371/38 |
| 4,748,627 | 5/1988 | Ohsawa | 371/38 |
| 4,766,573 | 8/1988 | Takemae | 371/38 |
| 4,775,979 | 10/1988 | Oka | 371/38 |

*Primary Examiner*—Michael R. Fleming

[57] ABSTRACT

An IC card particularly adapted for multiple functions and having an error checking capability which operates within the card and without the need for the processing power of the terminal. The IC card has an onboard memory and an onboard microprocessor. The onboard memory contains a plurality of application blocks to which access is selectively allowed by the microprocessor and a protected block which is accessible by the microprocessor but inaccessible by the terminal. Stored within the protected block are data specifying the location, size and application associated with each of the application blocks, as well as an error check code relating to the data then stored within the application block.

9 Claims, 2 Drawing Sheets

IC CARD HAVING INTERNAL ERROR CHECKING CAPABILITY

This invention relates to an IC card of the type having an onboard microprocessor and memory, and more particularly to a multi-function IC card.

BACKGROUND OF THE INVENTION

In such IC cards, the onboard microprocessor is adapted to control access by an external terminal to the onboard memory. Most typically, access is by way of the microprocessor reading specific areas of memory and outputting desired information on its I/O lines for coupling to the terminal. However, more direct transfers of information between the memory and an external device under the control of the microprocessor are also possible.

IC cards are being developed to perform ever more complex transactions, or groups of transactions, and in so doing are utilizing more and more of the processing power and storage capacity made available by modern microelectronics. Although the capabilities of the IC card are thus increasing, with the possibility of performing multiple types of diverse transactions in connection with the same or multiple types of diverse terminals, the demands on the capabilities of the IC card are becoming more stringent. In general, in a multiple application IC card, the card is designed to partition the onboard memory space into separate application blocks and to allow a particular application (i.e., a type of transaction to be performed with a particular type of terminal) access to only the application block or blocks of memory assigned to that type of transaction. Since the types of transactions are different in scope, complexity and amount of memory required, it is desirable to allow the onboard microprocessor to partition the memory into blocks of varying size.

In an IC card system, sequences of operation are usually performed between the IC card unit and the person who possesses the IC card, as well as between the card unit and a terminal which directly operates the IC card. If the IC card is inserted into the terminal by the operator, the terminal applies a power source clock or the like so as to actuate the IC card, thereby enabling discrimination, collation, identification of the possessor of the IC card and so forth between the IC card and the terminal. This preliminary sequence can often involve assuring that the card is compatible with the terminal, checking the identification of the user to ascertain whether he has proper possession of the card, determining that the application to be accessed is available through the terminal and accessible to the card, accessing a file in the terminal data base which is assigned to the particular user, etc.

After these preliminary operations have been completed, the terminal identifies a specific block in the memory of the IC card and gains access to this block in order to perform the desired application. While various methods are available for accessing the block and performing the application, the process involves, in any event, reading the accessed block of the memory.

In general, in the case of the conventional multi-application IC card, the overall data recording error management (data error checking) is performed by the terminal alone. That is, the IC card has, in application blocks of its memory, items of directory information for access to items of data recorded in the the memory, and error check codes appended to the recorded application data for data recording error management. While the IC card can read or write recording data by using the directory, it cannot recognize or interpret an error check code recorded as the tail end of items of data recorded in each block. To effect recording data error management, the terminal must use its processing power to provide a means for searching for an error check code which is contained in the recorded data items in the accessed application block, a means for performing error checking on the basis of the contents of the recorded data and the error check code which it had located, and a means for producing an error check code from data items to be recorded. Thus, in the case of the conventional IC card, it is the terminal which incorporates these means and performs recording data error management according to its particular error checking algorithm or procedure for accessing the card. In this case, to partially change a data block, it is necessary for the terminal to read out the whole of the corresponding data block recorded in the IC card (recording data and error check code) in order to produce an error check code for this data block, since an error check code is recorded in each individual data block in the IC card which is recorded by the terminal. If the terminal in question belongs to a group which provides a plurality of application systems, it must be provided with sets of means of the above-mentioned types adapted for different types of error check codes or error code setting methods specific to those application systems. Therefore, if the terminal performs the recording data error management, the load on the terminal increases substantially.

In addition, there is the possibility of recorded data and a corresponding error check code in the conventional IC card being intentionally changed since, as described above, both the recorded data and the error check code are read out by the terminal in order to process the recorded data. This change cannot be detected by performance of a subsequent error check code operation. There is therefore a problem in terms of data security.

An example of a conventional IC card having a self-checking or on the card function for data errors is also known. While this IC card can compute an error check code on board the card, it is necessary to attach an error check code to each individual data item. As a result, the proportion of memory areas occupied by error check codes is significantly increased, and this is disadvantageous in terms of efficiency of the use of the IC card memory.

SUMMARY OF THE INVENTION

In view of the foregoing, it is a general aim of the present invention to provide an IC card which is adaptable to plural diverse applications, but which performs data error management without significant added burden to the terminal equipment.

In that regard, it is an object of the present invention to perform error checking on the IC card itself, utilizing the onboard processor, while still allowing great flexibility in partitioning the memory into various sized blocks.

It is a more detailed object of the present invention to provide an IC card in which security of the stored data is enhanced while still allowing full terminal access to the actual application data.

To this end, there is provided an IC card adapted to interface with a terminal for performing a plurality of applications. The IC card has an onboard memory divided into a plurality of application blocks of variable (or different) size for storage of application data and a further block which is a protected block, i.e., cannot be accessed by the terminal. The protected block has a location related to each of the application blocks, and each location is adapted to store identification data and an error check code for the associated application block. The onboard microprocessor controls access to the memory in such a way as to prevent access to the protected block by the terminal, and to selectively allow access to the application blocks by the terminal. Prior to allowing terminal access to an application block, error checking of the stored data for the selected application is performed. When new data is written to the IC card memory in the application block, the computed error check code for the new data is stored in the protected block in the location associated with the selected application block.

In accordance with detailed aspects of the present invention, the IC card incorporates means for performing error checking of recording data, including a means for producing an error check code, and a means for performing error checking by using the error check code and the data. If the IC card is designed to also perform data correction, it further incorporates a data correction means. When data is recorded in a predetermined application block of the memory in the IC card, the error check code producing means simultaneously produces from this recording data an error check code related thereto, and this error check code is recorded in a protected block corresponding to the application block in which the data is recorded. Error checking of the recording data is performed by the error checking means on the basis of the data recorded in the application block and the error check code corresponding to this block. To also effect data correction, the correction means decodes the contents of the result of the checking performed by the error checking means, and corrects errors in the data. If the data is rewritten, a new error check code for the rewritten data in the application block is produced and is recorded in the corresponding protected block. In practice, a program for conducting the processing is stored in a ROM provided in the IC card and is executed by the microprocessor.

Other objects and advantages will become apparent from the following detailed description when taken in conjunction with the drawings, in which:

DESCRIPTION OF THE PREFERRED EMBODIMENT

While the invention will be described in connection with a preferred embodiment, there is no intent to limit it to that embodiment. On the contrary, the intent is to cover all alternatives, modifications and equivalents included within the spirit and scope of the invention as defined by the appended claims.

Figure 1:
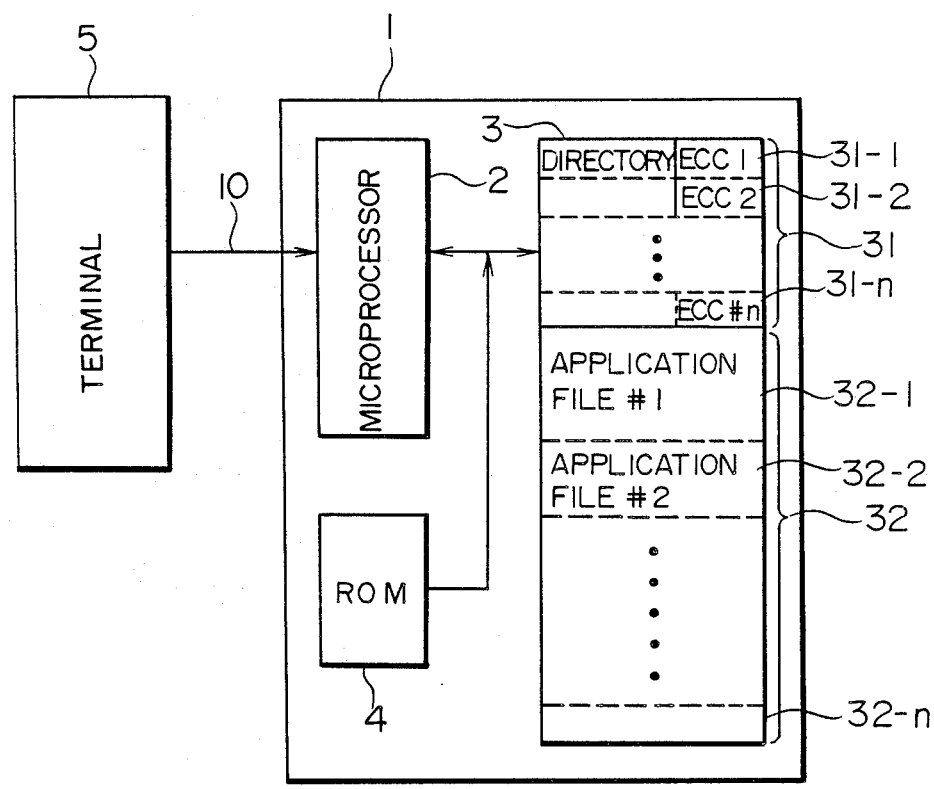
FIG. 1 is a block diagram showing an IC card constructed in accordance with the present invention interfaced with an external unit or terminal.

Turning now to the drawings, FIG. 1 shows an IC card 1, exemplifying the present invention, connected by a data path 10 to a terminal 5. The terminal 5 typically incorporates a reader/writer, has its own internal processor and also frequently has a communications link to a central computer or data base.

The IC card 1 has an onboard microprocessor 2 and memory means shown in the drawings as separate data memory 3 and program memory or ROM 4. The data memory 3 can be a RAM, an EPROM or an EEPROM, while the program memory can be a ROM or an EPROM or EEPROM. Conveniently, the memories 3, 4 are combined in the same memory device, and most conveniently are both incorporated on the same chip as the microprocessor such that the IC card 1 requires only a single semiconductor to be embedded therein and requires no connections between semiconductors.

Before further describing the internal structure of the IC card and the means for partitioning the memory, it will first be noted that the data path 10 provides a connection for transfer of data between the terminal 5 and the IC card 1. An example of such a connection is the non-contact IC card and terminal available today in which coupling coils on the IC card and terminal are brought into juxtaposition when the card is inserted in the terminal, such that data bits can be transferred from the card to the terminal or from the terminal to the card by magnetic coupling between the juxtaposed coils.

The terminal will not be described in detail since it is conventional and well known, but typically includes its own processor for performing local operations and a communications link to a central data base which maintains a central file for applications to be performed by all of the users which have access to the system.

Turning again to the IC card 1, the ROM 4 contains a stored program which controls the microprocessor 2 to cause the IC card 1 to perform the logical functions assigned to it. Typically, the ROM 4 is a comparatively limited section of memory which requires tight and simple programming in order to maximize the effectiveness of the IC card 1.

The data memory 3 is typically much larger than the ROM 4, but must also be efficiently utilized in order to gain maximum efficiency from the IC card 1. The largest part of the data memory 3 is devoted to an application area 32 which is divided into a series of application blocks 32-1, 32-2, . . . 32-n for storing data groups relating to the respective applications. The data memory 3 is also partitioned to provide a smaller protected block 31 which contains directory information for each of the application blocks as well as error correction code information for each of the application blocks. The area 31 is protected in the sense that the microprocessor 2 is programmed to prevent access to the protected area 31 by the terminal 5. The microprocessor 2, however, has access to the data within the protected area 31, but uses that information only internally of the IC card. The area 31 is protected by programming the ROM 4 in such a way that prevents the microprocessor 2 from addressing the locations within block 31 in connection with the program steps which allow transfer of data between the terminal 5 and data memory 3.

FIG. 1 illustrates that the application area 32 is divided into a plurality of application blocks 32-1, 32-2, . . . 32-n which are usually of different sizes. In certain circumstances, the blocks can be pre-partitioned before the IC card is put in service, or alternatively the microprocessor 2 in conjunction with its internal program and information received from the terminal 5 can partition the blocks during the course of performing its applications.

Within the protected area 31, and corresponding to each of the application blocks, is an application block information location, such as memory locations 31-1, 31-2, . . . 31-n. In the case of the protected area 31, each of the locations can be of the same size, and there is one location for each of the application blocks. As shown in FIG. 1, each of the application block identifier blocks or words contains information specific to the associated application block; the stored information includes directory data and an error check code for each associated application block. As one example, the directory information may contain a group of bits specifying an ID number of the particular application, a further group of bits specifying the starting address of the application file assigned to that application, and a further group of bits specifying the size of that application file. Thus, when the IC card 1 is inserted in a terminal 5 and the terminal requests access to a particular application, the microprocessor 2 can search the protected area 31 for the identification number of the requested application and then immediately has access to the starting location and size of the file within the application field 32 assigned to that particular application.

In addition, and in accordance with the invention, the processor also has access to an error check code stored in a protected area relating to the particular data which is then stored in the associated application file.

In accordance with the present invention, in the ROM 4 is also stored a program for producing an error check code, and a program for performing error checking. The microprocessor 2 conducts error check code information and data error checking. If data is recorded in an application block (e.g., application block 32-1) in the application area 32, an error check code related to this data is produced by the microprocessor 2, and this error check code is recorded in the memory location 31-1 in the protected area 31 corresponding to the application block 32-1. At the time of error checking, the microprocessor 2 checks the data recorded in the application block on the basis of the corresponding error check code. In other words, the error check code can be accessed on the basis of the directory information at the same time the application data is accessed based on the same directory information, so that both are available to allow the onboard microprocessor to perform an error check on the stored information.

In summary, in accordance with the present invention, the microprocessor reads out the error check code under the control of the program stored in the ROM. The microprocessor also reads out under control of the ROM the application data stored in the corresponding application block by using the corresponding directory data. Therefore, the error check code and the application data are simultaneously available and can be related to each other in the onboard microprocessor for any authorized application, and thus the error checking can be performed in the microprocessor for any application for which the IC card has been authorized.

Various methods are applicable to the error checking. An example of a well-known method relating to cyclic redundancy check is described in "Data Communication Handbook", issued by Denshi Tsushin Gakkai (Oct. 1984), pp. 49–53. In this method, a determinant is formed from items of serial data on the basis of an application of a principle which resides in that a unit matrix is obtained by multiplying a determinant by an inverse matrix thereof. If the result of this operation (usually called a syndrome) is zero, there is no data error. If it is not zero, the existence of data errors can be detected. To also effect data correction, it is necessary to previously store a data correction program in the ROM 4. In that case, the state of data error can be analyzed from the syndrome. Errors in the data are corrected by decoding the contents of the syndrome. When the data is rewritten, a new error check code for the data in the application block is produced and is recorded in the predetermined location in the corresponding protected area (that is, the error check code is rewritten).

The feature of processing the error check code, as described above, is important because it allows the checking of the application data to be carried out on the IC card rather than in the terminal. In the conventional IC card, the contents of the error check code cannot be recognized or interpreted by the microprocessor, so that the conventional IC card simply reads out and transfers the stored data to the terminal or writes and transfers the data from the terminal. Therefore, the stored error check code cannot be used in error checking. In the present invention, since the error check code is located with the directory, and the memory has a sufficient capacity, the error check code can be utilized in the IC card in error checking.

Figure 2:
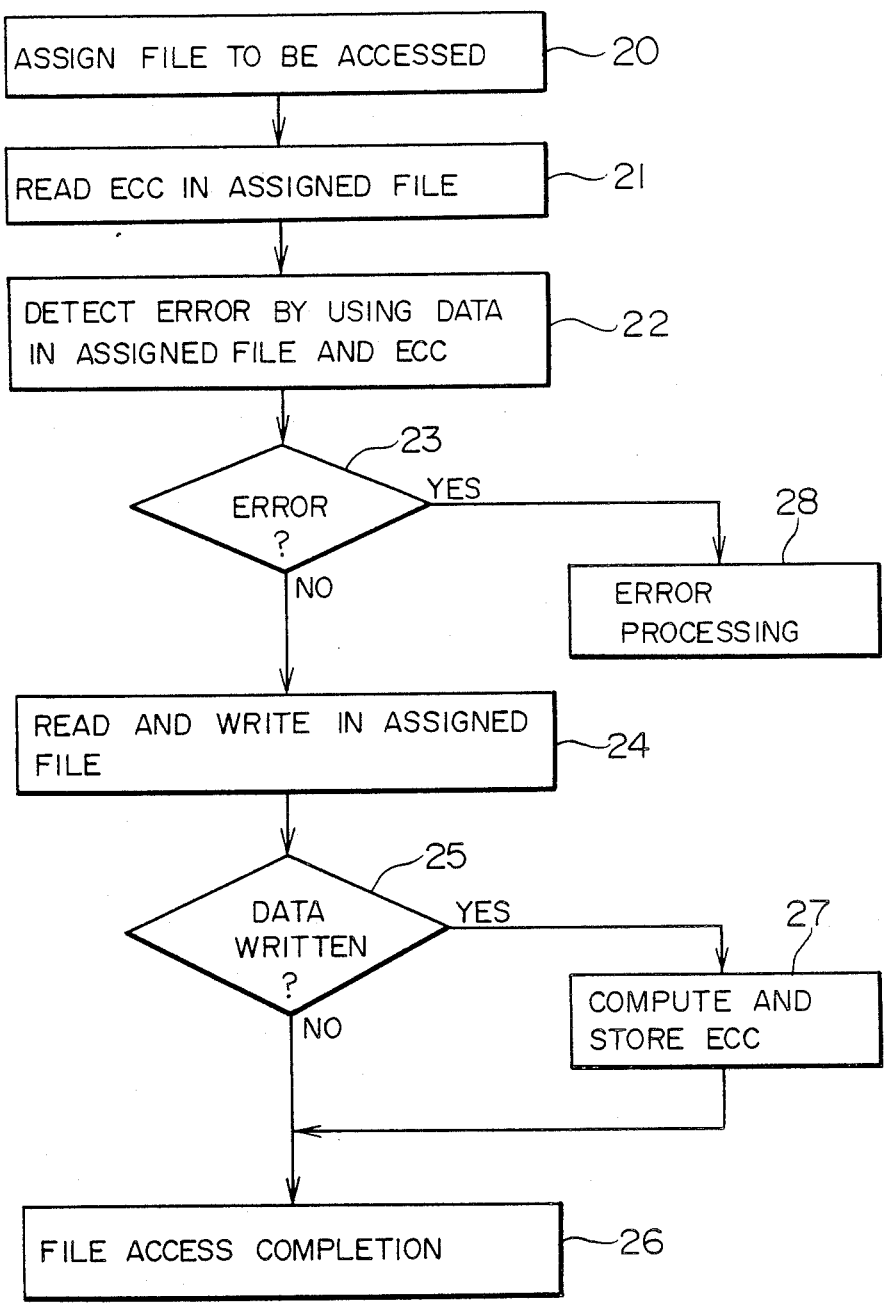
FIG. 2 is a block diagram showing an operational sequence of use of an IC card according to the present invention.

The operation of the IC card 1 in accordance with the present invention will be described below with reference to the flow chart shown in FIG. 2. It will be appreciated by those skilled in this art that when the ROM 4 is properly programmed, it renders the microprocessor and its associated memory structure as means for performing the steps described in connection with FIG. 2. It will also be appreciated that the procedure illustrated in FIG. 2 represents only a portion of an IC card transaction and does not, for example, illustrate the conventional steps of inserting the IC card in the terminal and performance of the necessary preliminary identification checks. As shown in FIG. 2, after the preliminary authentication is performed, a step 20 assigns an application file within the application blocks 32 for access by the terminal. Thus, the step 20 can be considered an open command which allows access to the application file. The type of application to be accessed is identified and, during the course of performance of the step 20, the directory information in the area 31 is searched to find the location having an application identification number which matches that to be assigned. Thus, the microprocessor 2 has at that time access to the address of the application block and the size of the block.

In practicing the invention, in the step 21, the microprocessor also has access to and reads the error check code which had previously been written into the location associated with that file based on the data then stored in the file. A step 22 is then performed on the data group resident in the application file block, by detecting an error on the data in the file. It is emphasized that the size of the application file can be different than that of the other files, but it is still operated on by the same processor and with the same error detecting program. If an error is detected in step 23, the program branches to a step 28 for error processing or error correction. In its simplest form, the error processing can take the form of simply aborting the transaction and returning the card to the user, and later the card is withdrawn by an issuer.

If no error is detected, the microprocessor 2 then makes the file available to the terminal for reading and writing information. The terminal may read certain information from the accessed file to determine starting parameters for the transaction to be performed, and on completing the transaction may write updated information into the same or different fields of the accessed file. Following the interaction between the terminal and the accessed block of memory, as controlled by the microprocessor 2, a step 25 is performed to determine if new data has been written into the onboard memory. If no data has been written, a step 26, which is, in effect, a close command, signifies that the file access is complete, and if the transaction is then complete, the card is returned to the user. However, if data has been written, a step 27 is performed, solely within the IC card, by which the microprocessor 2 performs a computation on the whole of data field within the selected application block. That error check code, by performance of the step 27, is then written into the protected area 31 of memory in the location reserved for the error check code for the application block in question. Thus, the new code is available the next time the application field is selected to assure continued integrity of the data. After the error check code is computed and recorded by way of step 27, the close command step 26 again signals that the file access is complete and control is returned either to the application program for accessing different files or the card returned to the user.

In the above-described embodiment, the error check code reading and the data error checking are performed at the start of the file access process while the error check code formation and recording are performed at the end of the file access process. However, the former may be performed when a read command is supplied from the terminal, while the latter is performed when a write command is supplied from the terminal. In this case, the flow chart is formed by deleting steps 20 and 26 from the chart shown in FIG. 2.

If the data correction is also performed after the recording data error checking has been performed, the syndrome which is the result of the above-mentioned checking may be decoded, thereby enabling errors in the data to be corrected. In that case, the process returns, after the error processing of step 28, to step 24.

It is worthy of note that by performing the error check code on the IC card two significant benefits result. First of all, the terminal need not be burdened with the performance of error checking, which would require reading out all of the data within the accessed application block before an error check computation could be performed. Instead, the error checking function is performed solely within the IC card without burdening the terminal. It is also significant to note that the error check code is performed without providing external access to the error check code itself and thus inhibiting the opportunity of unauthorized persons from tampering with the error check code and thereby tampering with the data. Not only is the error check performed on the IC card itself, and not only is it performed in such a way that the error check code is inaccessible to external devices, but it is furthermore performed in a multi-purpose IC card which is capable of accessing diverse applications and in which the applications can demand application blocks of memory which are of varying size, each with its own, protected error check code.

What is claimed is:

1. An IC card adapted to interface with at least one terminal for performing a plurality of applications, the IC card comprising in combination:
   onboard memory means divided into a plurality of application blocks for storage of information related to the applications, some of the application blocks being of a size different from others, the memory means also having a protected block for storage of application block information including directory data and an error check code relating to each of the plurality of application blocks;
   an onboard microprocessor for controlling access to the memory in such a way as to prevent access to the protected block by the terminal and to selectively allow access to the application blocks by the terminal for selectively performing the applications; and
   program means for causing the microprocessor
   (a) to compute an error check code for a data group related to one of the plurality of applications, and to store the data group in a selected application block and the computed error check code in the protected block in the location associated with the selected application block when the data group is sent from the terminal,
   (b) to detect data error in the stored data group in an application block accessed from the terminal by using the data group and the error check code thereof when the data block is read out to the terminal.

2. An IC card according to claim 1 wherein the protected block includes a plurality of memory locations, one for each application block, the protected block being configured such that the information related to the application blocks associates the directory data with the error check code for each respective application block.

3. An IC card according to claim 2 further including means responsive to an open command for accessing a particular application file to initiate the detection step (b) and means responsive to a close command for completing access to an application block for invoking the computation step (a).

4. An IC card according to claim 3 wherein there is provided means for detecting whether the data in an application block has been written and in response thereto invoking step (a) of computing an error check on the rewritten data.

5. An IC card according to claim 2 including means responsive to reception of a read command from the terminal for invoking step (b) of detecting a data error and means for responding to a write command from the terminal for invoking step (a) of computing an error check.

6. A method of operating a multiple application IC card, the IC card having an onboard microprocessor and an onboard memory, the method comprising the steps of
   (a) partitioning the memory into a protected block and a plurality of application blocks relating to the plurality of applications, at least some of the application blocks being of a size different than others,
   (b) storing application block information in the protected block including directory data indicating the locations of the respective application blocks associated with an error check code relating to the data stored within the application blocks, (c) responding to a request for access to a selected application block by locating the block using the stored directory data and performing an error check on the stored data using the error check code stored in the protected block which corresponds to the selected application block, and (d) responding to an operation in which data within a selected application block is altered by performing an error check code computation on the data within the selected block and storing the error check code in the protected area in the location associated with the selected block.

7. A method according to claim 6 further including the step of testing for the performance of a write operation and performing step (d) when a write operation is detected.

8. A method according to claim 6 wherein the step (d) is invoked after all of the read and write operations are completed in a file access operation.

9. A method according to claim 6 in which the step (c) is performed in response to a read command directed to the selected application block and the step (d) is performed in connection with a write command directed to the selected application block.

* * * * *